US010141858B2

(12) United States Patent
Toda et al.

(10) Patent No.: US 10,141,858 B2
(45) Date of Patent: Nov. 27, 2018

(54) POWER CONVERTER FOR ELECTRIC LOCOMOTIVE

(71) Applicant: KABUSHIKI KAISHA TOSHIBA, Minato-ku, Tokyo (JP)

(72) Inventors: Shinichi Toda, Fuchu Tokyo (JP); Ikuo Yasuoka, Tama Tokyo (JP); Saburou Souma, Tokorozawa Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 253 days.

(21) Appl. No.: 15/030,021

(22) PCT Filed: Aug. 26, 2014

(86) PCT No.: PCT/JP2014/072230
§ 371 (c)(1),
(2) Date: Apr. 15, 2016

(87) PCT Pub. No.: WO2015/060000
PCT Pub. Date: Apr. 30, 2015

(65) Prior Publication Data
US 2016/0285380 A1    Sep. 29, 2016

(30) Foreign Application Priority Data

Oct. 25, 2013 (JP) .................................. 2013-222403

(51) Int. Cl.
*H02M 5/458* (2006.01)
*H02M 1/12* (2006.01)
(Continued)

(52) U.S. Cl.
CPC ............. *H02M 5/458* (2013.01); *B60L 1/003* (2013.01); *B60L 9/28* (2013.01); *B60L 15/007* (2013.01);
(Continued)

(58) Field of Classification Search
CPC .................................................. H02M 5/458
USPC ........................................................ 307/9.1
See application file for complete search history.

(56) References Cited

U.S. PATENT DOCUMENTS

2005/0284673 A1   12/2005   Nakazawa et al.
2010/0090533 A1    4/2010   Shimada et al.
2012/0296507 A1   11/2012   Matsumoto

FOREIGN PATENT DOCUMENTS

CN      101611536 A     12/2009
JP       02164201 A      6/1990
(Continued)

OTHER PUBLICATIONS

Chinese Office Action (and English translation thereof) dated Jan. 12, 2017 issued in counterpart Chiense Application No. 201780056440.7.

(Continued)

*Primary Examiner* — Joseph Chang
(74) *Attorney, Agent, or Firm* — Holtz, Holtz & Volek PC

(57) ABSTRACT

A power converter for an electric locomotive includes an insulating transformer, an AC/DC converter, an inverter, a PWM controller, and a voltage controller. The insulating transformer is supplied with high-voltage AC power from an AC overhead wire to convert a high voltage to a low voltage and output low-voltage AC power. The AC/DC converter receives the low-voltage AC power and performs AC/DC conversion. The inverter receives an output from the AC/DC converter and performs DC/AC conversion for supply to a load. The PWM controller outputs a PWM control signal having a predetermined pattern, the pattern for removing specific harmonic components from an output of the inverter or attenuating the specific harmonic components to at most a predetermined level. The voltage controller controls a DC output voltage of the AC/DC converter to control an output voltage of the inverter.

9 Claims, 4 Drawing Sheets

(51) Int. Cl.
*B60L 1/00* (2006.01)
*B60L 9/28* (2006.01)
*B60L 15/00* (2006.01)
*H02M 1/08* (2006.01)
*H02M 1/00* (2006.01)

(52) U.S. Cl.
CPC .............. *H02M 1/08* (2013.01); *H02M 1/12* (2013.01); *H02M 5/4585* (2013.01); *B60L 2200/26* (2013.01); *B60L 2210/30* (2013.01); *B60L 2210/40* (2013.01); *H02M 2001/0009* (2013.01); *Y02T 10/645* (2013.01); *Y02T 10/7241* (2013.01)

(56) References Cited

FOREIGN PATENT DOCUMENTS

| | | |
|---|---|---|
| JP | H053605 A | 1/1993 |
| JP | 11299290 A | 10/1999 |
| JP | 2004266911 A | 9/2004 |
| JP | 2005102455 A | 4/2005 |
| JP | 2006025591 A | 1/2006 |
| JP | 2007074810 A | 3/2007 |
| JP | 2007151392 A | 6/2007 |
| JP | 2010200537 A | 9/2010 |
| JP | 5121755 B2 | 1/2013 |
| WO | 2011070609 A1 | 6/2011 |

OTHER PUBLICATIONS

International Search Report (ISR) dated Dec. 2, 2014 issued in International Application No. PCT/JP2014/072230.
Japanese Office Action dated Dec. 6, 2016, issued in counterpart Japanese Application No. 2013-222403.

POWER CONVERTER FOR ELECTRIC LOCOMOTIVE

FIELD

Embodiments described herein relate generally to a power converter for an electric locomotive.

BACKGROUND

A power converter for an electric locomotive supplied with power from an AC overhead wire includes a main power converter which controls an electric driving motor and an auxiliary power converter (auxiliary power supply) for supplying power to a compressor and a cooling blower in the locomotive.

The main power converter and the auxiliary power converter are supplied with AC power from individual secondary windings of a main transformer which receives power from the AC overhead wire, to convert the AC power to DC power by individual converters (AC/DC converting circuits).

In the main power converter, a variable voltage, variable frequency inverter is connected to a stage following the converter.

In the auxiliary power converter, a constant voltage, constant frequency inverter (APU: auxiliary power unit) is connected to a stage following the converter.

The above-described conventional auxiliary power converter is provided with a three-phase LC resonant filter (low-pass filter) in order to decrease harmonic components of a three-phase AC output to obtain an approximately sinusoidal waveform.

In case of an electric locomotive, a reactor L of the LC resonant filter is required to have a capacity of approximately 380 V, 50 Hz, and 230 kVA when an inductance is approximately 380 µH.

Therefore, the reactor L becomes significantly large in weight of 400 kg or heavier, which causes an increase in the size of the power converter including the APU circuit.

DETAILED DESCRIPTION

According to an embodiment, a power converter for an electric locomotive comprises an insulating transformer, an AC/DC converter, an inverter, a PWM controller, and a voltage controller. The insulating transformer is supplied with high-voltage AC power from an AC overhead wire to convert a high voltage to a low voltage and output low-voltage AC power. The AC/DC converter receives the low-voltage AC power and performs AC/DC conversion. The inverter receives an output from the AC/DC converter and performs DC/AC conversion for supply to a load. The PWM controller outputs a PWM control signal having a predetermined pattern, the pattern for removing specific harmonic components from an output of the inverter or attenuating the specific harmonic components to a predetermined level or lower. The voltage controller controls a DC output voltage of the AC/DC converter to control an output voltage of the inverter.

Hereinafter, an embodiment will be described with reference to the drawings.

[1] First Embodiment

Figure 1:
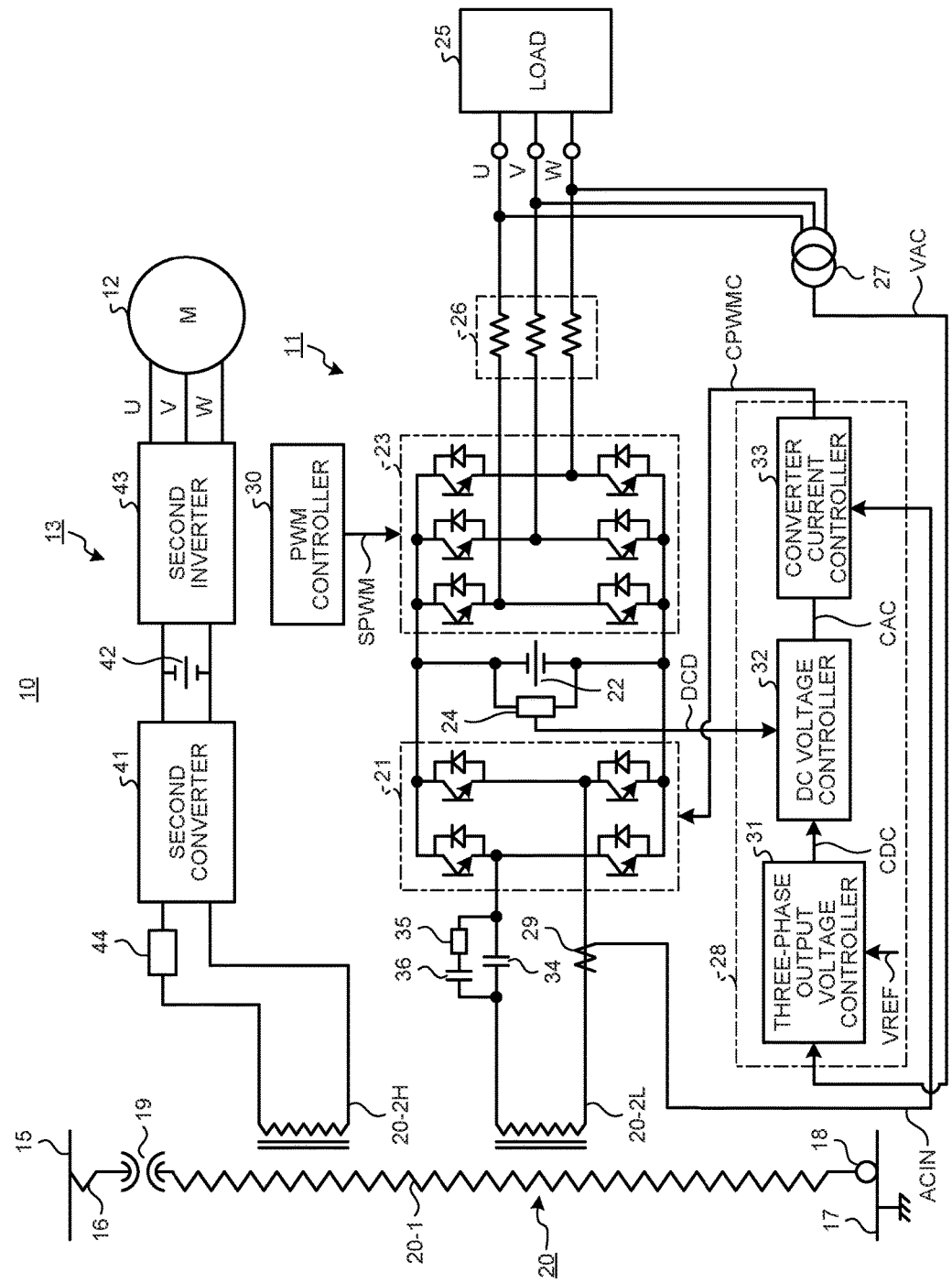
FIG. 1 is a schematic configuration block diagram of a power converter for a railroad vehicle according to a first embodiment.

FIG. 1 is a schematic configuration block diagram of a power converter for a railroad vehicle according to a first embodiment.

In the following, high voltage and low voltage are defined according to the classification of voltage stipulated in Article 3 of the ministerial ordinance establishing technical standards concerning electrical equipment.

A power converter for a railroad vehicle 10 includes an auxiliary power converter 11 which supplies power to various instruments mounted on a railroad vehicle and a main power converter 13 which drives a three-phase AC motor 12 for driving the railroad vehicle.

In the power converter for the railroad vehicle 10, a high-speed breaker 19 and a primary winding 20-1 of a transformer 20 are connected in series between a pantograph 16 supplied with AC power from an AC overhead wire (AC feeder) 15 (high-potential side power supply) and a wheel 18 grounded (low-potential side power supply) through a railroad 17.

The auxiliary power converter 11 includes a first converter 21 connected to a first secondary winding 20-2L on a low-voltage side (low-voltage AC power side) of the transformer 20 and supplied with low-voltage AC power to convert the AC power to DC power, a filter capacitor 22 provided between output terminals of the first converter 21 for removing a harmonic current, a first inverter 23 connected in series to the first converter 21 to convert the DC power from the first converter 21 to three-phase AC power, a DC voltage sensor 24 connected in parallel to the filter capacitor 22 to detect a DC output voltage of the first converter 21 as a voltage between both ends of the filter capacitor 22 and output a DC voltage detection signal DCD, and a three-phase reactor 26 connected to output terminals of the first inverter 23 for inhibiting a change rate of an applied voltage to a load 25.

The auxiliary power converter 11 further includes an AC voltage sensor (voltage converter) 27 which detects an output voltage of the three-phase reactor 26, a voltage controller 28 which indirectly controls an output voltage of the first inverter 23 by controlling a current through the first converter 21 according to an output of the DC voltage sensor 24 and an output of the AC voltage sensor 27, an AC input current sensor 29 which detects an input current of the first converter 21 to output an AC input current detection signal ACIN, and a PWM controller 30 which outputs a PWM control signal SPWM having a predetermined pattern for removing a specific harmonic component from an output of the first inverter 23 or attenuating the same to a predetermined level or lower.

In the above-described configuration, the first inverter 23 serves as an APU.

The voltage controller 28 is provided with a three-phase output voltage controller 31 which compares a detected voltage VAC of the AC voltage sensor 27 with an output reference voltage VREF being a reference value of output voltage to the load 25, to output a DC voltage command value (DC voltage command signal) CDC, a DC voltage controller 32 which outputs an AC input current command value (AC input current command signal) CAC for controlling an DC output voltage of the first converter 21 according to the DC voltage command value CDC and the DC voltage detection signal DCD, and a converter current controller 33 which outputs a converter PWM output signal CPWMC for controlling an output voltage of the first converter 21 according to the AC input current detection signal ACIN and the AC input current command value CAC.

Furthermore, an AC breaker 34 is connected in series to the first secondary winding 20-2L on the low-voltage side of the transformer 20. A charging resistance 35 and a charging resistance connecting contactor 36 connected in series are provided in parallel to the AC breaker 34. The charging resistance connecting contactor 36 electrically connects the charging resistance 35 to the first secondary winding 20-2L on the low-voltage side of the transformer 20.

The main power converter 13 includes a second converter (second AC/DC converter) 41 connected to a second secondary winding 20-2H of the transformer 20 supplied with a high-voltage AC power through an input 44 to convert the AC power to DC power, a filter capacitor 42 provided between output terminals of the second converter 41 for removing a harmonic current, and a second inverter 43 connected in series to the second converter 41 to convert the DC power from the second converter 41 to three-phase AC power for output to the three-phase AC motor 12.

In the above-described configuration, the input 44 includes a not-illustrated AC breaker connected in series between the second secondary winding 20-2H and the second converter 41, and a not-illustrated charging resistance and a not-illustrated charging resistance connecting contactor connected in series and provided in parallel to the AC breaker. The charging resistance connecting contactor electrically connects the charging resistance to the second secondary winding 20-2H. The AC breaker, the charging resistance, and the charging resistance connecting contactor have functions similar to those of the AC breaker 34, the charging resistance 35, and the charging resistance connecting contactor 36, respectively.

Next, the operation of the first embodiment is described.

When the AC power is supplied to the primary winding 20-1 of the transformer 20 of the power converter for the railroad vehicle 10 from the AC overhead wire 15 through the pantograph 16 and the high-speed breaker 19, the auxiliary power converter 11 closes (turns on) the charging resistance connecting contactor 36 before closing (turning on) the AC breaker 34.

Thereby, a current of the AC power is supplied through the charging resistance 35 and full-wave rectified to four switching transistors (for example, IGBTs) of the first converter 21 through diodes connected in parallel, to charge the filter capacitor 22.

When the filter capacitor 22 is fully charged, the current of the AC power becomes minute or stops flowing. Therefore, the auxiliary power converter 11 can prevent a large transient current from flowing at the closing of the AC breaker 34 by closing (turning on) the AC breaker 34, thereby preventing fusion of the AC breaker 34, for example.

Thereafter, high power can be supplied from the AC overhead wire (AC feeder) 15 to the first converter 21 and the low-voltage AC power (of 400 V, for example) is supplied from the first secondary winding 20-2L of the low-voltage side (low-voltage AC power side) of the transformer 20 to the first converter 21 of the auxiliary power converter 11.

Thereby, the first converter 21 converts the input low-voltage AC power to the DC power for output from the output terminals.

The filter capacitor 22 provided between the output terminals of the first converter 21 removes the harmonic current from the DC power from the first converter 21 for output to the first inverter 23.

The first inverter 23 converts the DC power from the first converter 21 to the three-phase AC power for output to the three-phase reactor 26 while removing the specific harmonic component from an output signal or attenuating the same to a predetermined level or lower according to the PWM control signal SPWM having a predetermined pattern output from the PWM controller 30, as described later in detail.

Thereby, the three-phase reactor 26 inhibits the change rate of the applied voltage corresponding to the three-phase AC power from the first inverter 23 for output to the load 25. An inductance of each reactor of the three-phase reactor 26 is approximately 40 µH when the power supply to the load is 380 V, 50 Hz, and 230 kVA, for example.

Therefore, by the connection to the three-phase reactor 26, the applied voltage is inclined by approximately 20 V/µsec. Because of this, even directly applied with a PWM voltage corresponding to the PWM control signal SPWM, the load 25 connected to the first inverter 23 serving as the APU will suffer no damage.

Accordingly, the load 25 is supplied with the DC power with the specific harmonic component removed or attenuated to a predetermined level or lower and at the inhibited voltage change rate. Thus, the auxiliary power converter 11 can stably drive the load 25.

Now, a description is made on a principle for removing the specific harmonic component from the output signal or attenuating the same to a predetermined level or lower by the first inverter 23.

Figure 2:
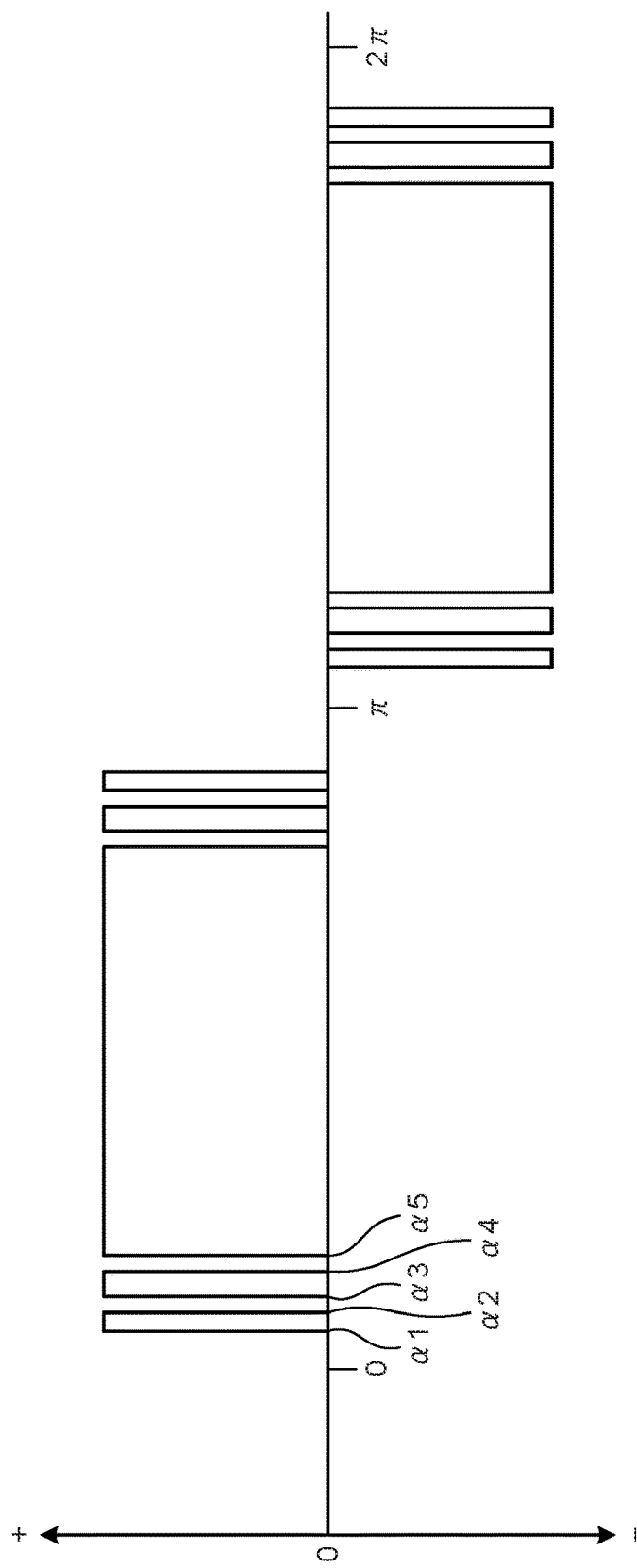
FIG. 2 is a waveform diagram of a PWM control signal output from a PWM controller according to the first embodiment.

FIG. 2 is a waveform diagram of the PWM control signal output from the PWM controller.

FIG. 2 illustrates a waveform of the PWM control signal SPWM for removing fifth, seventh, eleventh, thirteenth, and seventeenth harmonic components from the DC output signal (output voltage) of the first inverter 23.

In the first embodiment, eighteenth and subsequent harmonic components are considered to cause no practical problem in the operation of the load 25, therefore, it is not necessary to provide an LC resonant filter at a stage following the first inverter 23.

As illustrated in FIG. 2, the PWM control signal of the first embodiment has a PWM pulse pattern including five pulses in one period of a fundamental wave, the five pulses corresponding to removal of the fifth, seventh, eleventh, thirteenth, and seventeenth harmonic components.

In FIG. 2, the PWM pulse pattern has a symmetrical shape, in which three firing angles $\alpha1$, $\alpha3$, and $\alpha5$ correspond to ON timings of the switching transistors (for example, IGBTs) of the first inverter 23 and two extinction angles $\alpha2$ and $\alpha4$ correspond to OFF timings of the switching transistors of the first inverter 23.

In FIG. 2, the three firing angles $\alpha1$, $\alpha3$, and $\alpha5$ and the two extinction angles $\alpha2$ and $\alpha4$ remove the fifth, seventh, eleventh, thirteenth, or seventeenth harmonic components as a whole, for example.

In more detail, the firing angle $\alpha1=11.349°$, the extinction angle $\alpha2=17.2616°$, the firing angle $\alpha3=23.8017°$, the extinction angle $\alpha4=34.8708°$, and the firing angle $\alpha5=37.2567°$.

The firing angles $\alpha1$, $\alpha3$, and $\alpha5$ and the extinction angles $\alpha2$ and $\alpha4$ are analytically calculated by Fourier series expansion theory from a specific PWM pulse pattern corresponding to predetermined voltage and frequency (AC frequency). Therefore, for removing n harmonic components, similarly, the PWM control signal having a PWM pulse pattern including n pulses in one period of the fundamental wave is generated.

As described above, since the PWM pulse pattern is constant depending on the harmonic component to be removed, a pulse width cannot be changed. Therefore, it is not possible to change the output voltage of the first inverter 23 as in the general PWM control.

In view of this, in the first embodiment, the input voltage of the first inverter 23, that is, the output voltage of the first converter 21 is controlled in order to change the output voltage of the first inverter 23.

Hereinafter, the control over the output voltage of the first converter will be described in detail.

In order to control the output voltage of the first converter 21, the AC voltage sensor 27 detects the output voltage of the three-phase reactor 26 and outputs the same to the voltage controller 28.

Concurrently, the DC voltage sensor 24 connected in parallel to the filter capacitor 22 detects the DC output voltage of the first converter 21 as the voltage at both ends of the filter capacitor 22 and outputs the same to the voltage controller 28.

Thereby, the voltage controller 28 controls the current through the first converter 21 according to the output of the AC voltage sensor 27 indicating the output voltage of the three-phase reactor 26, that is to say, input voltage of the load 25.

Then, the AC input current sensor 29 detects the input current of the first converter 21 and outputs the AC input current detection signal ACIN.

The three-phase output voltage controller 31 of the voltage controller 28 compares the detected voltage VAC of the AC voltage sensor 27 with the reference output voltage VREF to the load 25 and outputs the DC voltage command value CDC to the DC voltage controller 32.

The DC voltage controller 32 outputs, to the converter current controller 33, the AC input current command value CAC for controlling the DC output voltage of the first converter 21 according to the DC voltage command value CDC and the detected voltage DCD of the DC voltage sensor 24.

The converter current controller 33 outputs, to the first converter 21, the converter PWM output signal CPWMC for controlling the AC output voltage of the first converter 21 according to the AC input current detection signal ACIN and the AC input current command value CAC.

As a result, the output voltage of the first converter 21 is controlled to supply the three-phase AC voltage of a predetermined value (380 V, for example) to the load 25.

Meanwhile, concurrently with the above-described operation of the auxiliary power converter 11, the second converter (second AC/DC converter) 41 of the main power converter 13 receives the high-voltage AC power from the second secondary winding 20-2H of the transformer 20 through the input 44 and converts it to the DC power for output to the second inverter 43.

The filter capacitor 42 removes the harmonic current from the DC power output from the second converter.

Then, the second inverter 43 receives the DC power from the second converter 41 and converts it to the three-phase AC power for output to the three-phase AC motor 12 to drive the three-phase AC motor 12 to drive a not-illustrated electric locomotive.

As described above, the low-order harmonics (in the first embodiment, the fifth, seventh, eleventh, thirteenth, and seventeenth harmonic components) of the output of the first inverter 23 are reduced enough not to require the connection of the LC resonant filter to the output (subsequent stage) of the first inverter 23.

Therefore, the low-order harmonics of the output current are also reduced, which can reduce an influence from the harmonic components on the load connected to the APU.

The effects of the first embodiment are now described in more detail.

According to the first embodiment as described above, the first inverter 23 is configured not to output low-order harmonics, specifically, the fifth, seventh, eleventh, thirteenth, and seventeenth harmonic components. Because of this, the inductance of the reactor connected to the output of the first inverter 23 can be significantly reduced since the connection of the reactor is intended only for inhibiting a voltage change rate of a square wave output voltage as the PWM.

On the other hand, to remove the fifth and higher-order harmonic components with the LC resonant filter including the reactors as in the conventional technique, the resonance frequency of the reactor and the capacitor connected to each phase (U, V, and W phases) of the output of the first inverter 23 has to be set to the frequency five times as large as the power supply frequency equivalent to the fifth-order harmonic, that is, $250(=50\times5)$ Hz. Therefore, for the load requiring power supply of approximately 380 V, 50 Hz, and 230 kVA, the reactor needs to have the inductance of approximately 380 μH and will weigh approximately 420 kg. A capacity of the capacitor of the LC resonant filter to be connected to each phase is approximately 300 μF.

Further, according to the first embodiment, the eighteenth (harmonic components) and subsequent harmonic components cause no problem in the connected load 25. Accordingly, it is not necessary to provide the LC resonant filter at the stage subsequent to the first inverter 23.

Thus, at the stage following the first inverter 23, only the reactor is needed for inhibiting the change rate of output voltage of the inverter, as illustrated in FIG. 1.

Therefore, in the first embodiment, the three-phase reactor 26 is provided at the subsequent stage of the first inverter 23 in place of the LC resonant filter.

As described above, the required inductance of each reactor of the three-phase reactor 26 is approximately 40 μH. Thus, the inductance can be approximately one-eighth to one-tenth of the inductance of 380 μH of the reactor included in the LC resonant filter for removing the fifth and higher-order harmonic components.

As a result, according to the first embodiment, no large-size reactors are needed at the output of the first inverter 23, which can accordingly downsize the auxiliary power converter 11 and the power converter for the railroad vehicle 10.

[1.1] Modification of First Embodiment

The above has described a case in which the eighteenth and subsequent harmonic components do not cause no practical problem in the operation of the load 25. However, when the eighteenth and subsequent harmonic components are considered to affect the operation of the load 25, the LC resonant filter needs to be provided at the stage subsequent to the first inverter 23.

Figure 3:
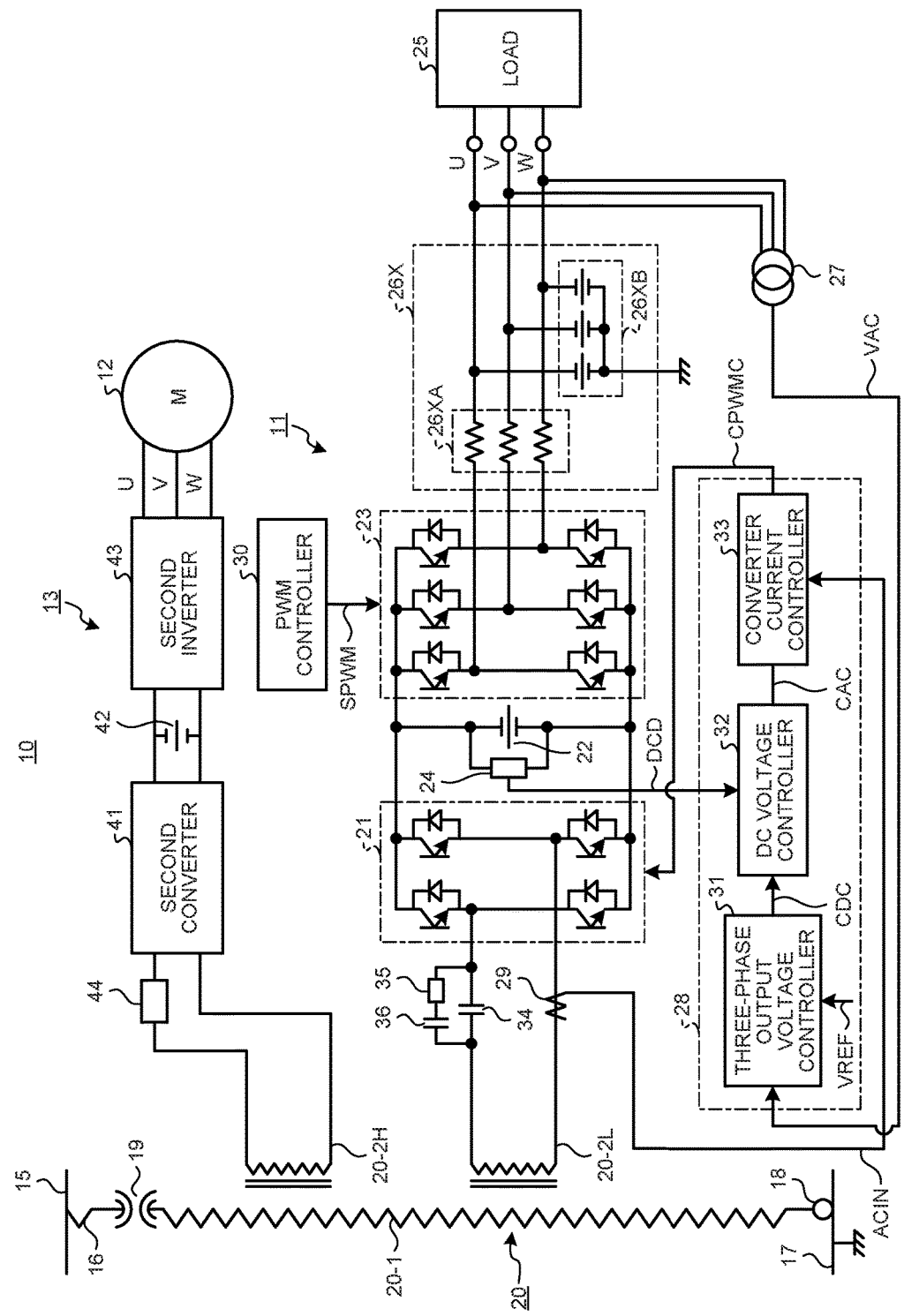
FIG. 3 is a schematic configuration block diagram of a power converter for a railroad vehicle according to a modification of the first embodiment.

FIG. 3 is a schematic configuration block diagram of a power converter for a railroad vehicle according to a modification of the first embodiment.

In FIG. 3, the same reference numerals are assigned to the same elements as those of the first embodiment in FIG. 1.

The power converter for a railroad vehicle in the modification of the first embodiment is different from the power converter for a railroad vehicle of the first embodiment in that it includes, in place of the three-phase reactor 26, a three-phase reactor 26XA and a three-phase capacitor 26XB forming an LC resonant filter 26X which removes the eighteenth and subsequent harmonic components.

In the modification of the first embodiment, the first inverter 23 is configured not to output low-order harmonics, specifically, the fifth, seventh, eleventh, thirteenth, and seventeenth harmonic components, as described in the first embodiment.

Therefore, to connect the three-phase reactor 26XA and the three-phase capacitor 26XB of the LC resonant filter 26X to the output of the first inverter 23, the resonance frequency of the LC resonant filter 26X provided with the three-phase reactor 26XA and the three-phase capacitor 26XB can be also set to be equivalent to the seventeenth harmonic component. Accordingly, the inductance of the three-phase reactor 26XA of the LC resonant filter 26X can be obtained as follows: 250 Hz/850 Hz=1/3.4, that is to say, 380 μH/3.4=approximately 112 μH.

As a result, the inductance can be decreased to approximately 1/3.4 of the inductance of 380 μH of the reactor required for removing the fifth and higher-order harmonic components with the LC resonant filter, which can downsize the three-phase reactor 26XA significantly.

As described above, according to the modification of the first embodiment, even with the LC resonant filter provided, the cutoff frequency thereof can be set to a central frequency of the eighteenth harmonic component or higher, so that the LC resonant filter can be downsized, resulting in downsizing the auxiliary power converter 11 and the power converter for a railroad vehicle 10.

[2] Second Embodiment

Figure 4:
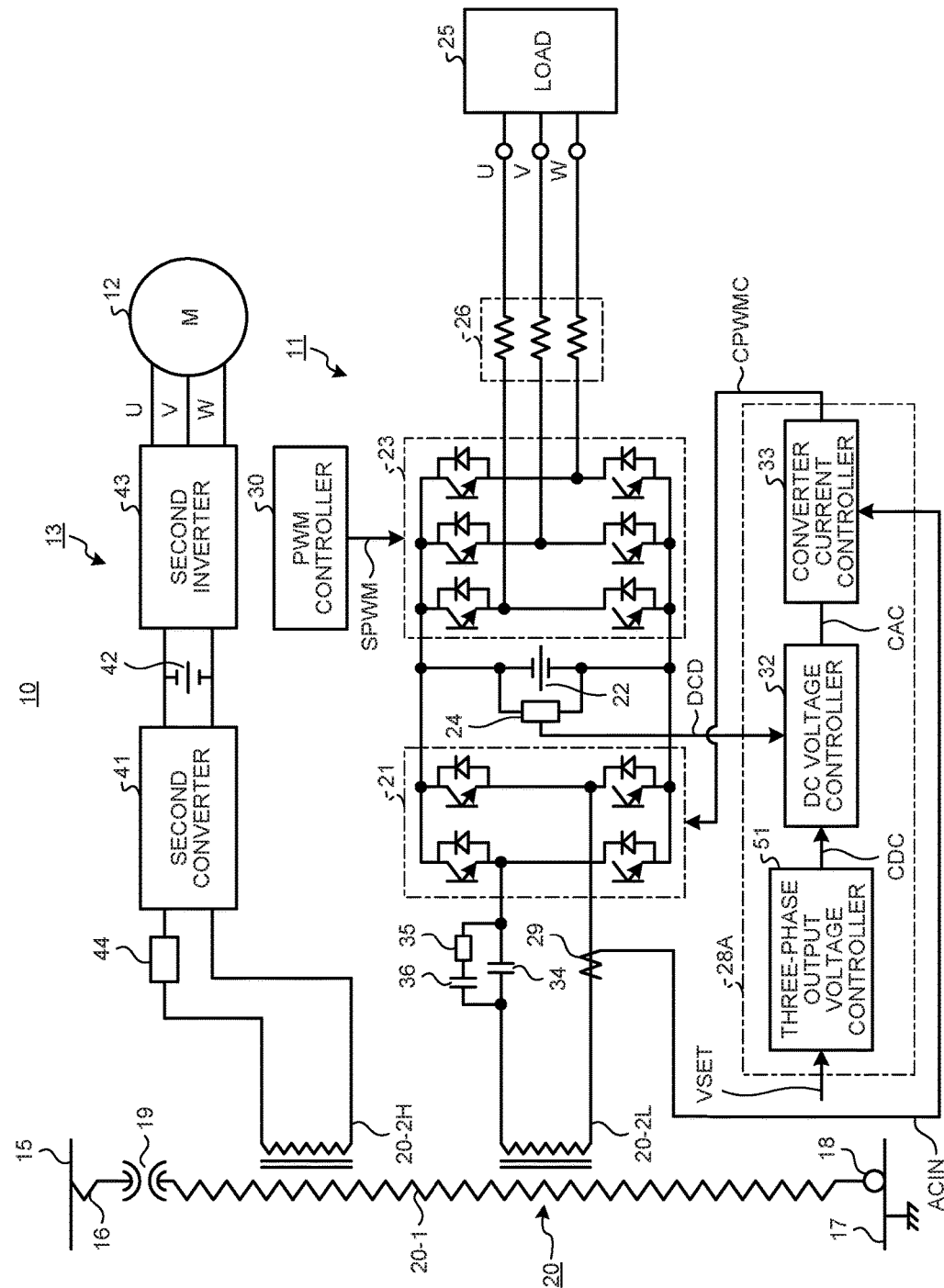
FIG. 4 is a schematic configuration diagram of a power converter for a railroad vehicle according to a second embodiment.

FIG. 4 is a schematic configuration block diagram of a power converter for a railroad vehicle according to a second embodiment.

In FIG. 4, the same reference numerals are assigned to the same elements as those of the first embodiment in FIG. 1.

A power converter for a railroad vehicle 10 of the second embodiment is firstly different from the power converter for a railroad vehicle 10 of the first embodiment in that it excludes the AC voltage sensor (voltage converter) 27 which detects the output voltage of the three-phase reactor 26.

Secondly, it additionally includes a voltage controller 28A which includes a DC voltage command calculator 51 which outputs, to a DC voltage controller 32, a DC voltage command value CDC for specifying the output voltage of the first converter 21 according to an output voltage command signal VSET for specifying the output voltage of the first inverter 23.

In this case, the output voltage command signal VSET can be appropriately set depending on the load 25 to be connected.

The difference between the operations of the second embodiment and the first embodiment is in the operation of the voltage controller 28A, so that the operation of the voltage controller 28A will be mainly described hereinafter and the description of the first embodiment will be employed for the other operations.

As in the first embodiment, the second embodiment is also configured that the input voltage of the first inverter 23, that is, the output voltage of the first converter 21 is controlled to control the output voltage of the first inverter 23.

Hereinafter, the control over the output voltage of the first converter will be described in detail.

Note that the output voltage command signal VSET is set in advance.

Thus, the DC voltage command calculator 51 of the voltage controller 28A performs calculation according to the output voltage command signal VSET and outputs, to the DC voltage controller 32, the DC voltage command signal CDC for specifying the output voltage of the first converter 21.

The DC voltage controller 32 outputs, to the converter current controller 33, an AC input current command value CAC for controlling the output voltage of the first converter 21 according to the DC voltage command value CDC and a detected voltage of the DC voltage sensor 24.

The converter current controller 33 outputs, to the first converter 21, the converter PWM output signal CPWMC for controlling the AC output voltage of the first converter 21 according to the AC input current detection signal ACIN and the AC input current command value CAC.

As a result, the DC output voltage of the first converter 21 is controlled to supply the three-phase AC voltage of a predetermined value (380 V, for example) to the load 25.

As described above, according to the second embodiment, by the lowered inductance of the three-phase reactor 26, it becomes possible to ignore a drop in the voltages of the reactors of the three-phase reactor 26 along with the downsizing of the reactor. Because of this, the voltage of the three-phase reactors 26 can be accurately controlled sufficiently without feedback control, so that the second embodiment can attain the same effects by feedforward control as those of the first embodiment.

Therefore, the AC voltage sensor 27 which detects the output voltage of the three-phase reactor 26 and the wiring for feedback control can be omitted, which can accordingly simplify the configuration of the power converter and achieve a reduction in the size and manufacturing costs of the power converter.

[3] Modification of Embodiment

The above has described the configuration in which the fifth, seventh, eleventh, thirteenth, and seventeenth harmonic components are removed from the harmonic components of the output voltage of the first inverter 23. However, arbitrary-order harmonic components can be removed.

In this case, a harmonic order n of the AC output of the inverter is represented by the following equation:

$$n = k \cdot p \pm 1 \ (k=1,2,3,\ldots)$$

where p represents a fundamental number of phases (pulsation rate).

That is to say, in case of a three-phase AC output inverter as the first inverter 23, p=6, so that n=5, 7, 11, 13, 17, 19, . . . is obtained.

Therefore, it becomes possible to remove nth harmonic components satisfying the above-described equation.

Furthermore, the magnitude of voltage of the nth harmonic components is 1/n of the voltage of a fundamental wave, and if the voltage is sufficiently negligible for the load 25, it does not need to be removed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power converter for an electric locomotive comprising:
   an insulating transformer supplied with high-voltage AC power from an AC overhead wire to convert a high voltage to a low voltage and output low-voltage AC power;
   an AC/DC converter that receives the low-voltage AC power and performs AC/DC conversion;
   an inverter that receives an output from the AC/DC converter and performs DC/AC conversion for supply to a load;
   a PWM controller that outputs a PWM control signal having a predetermined pattern for removing specific harmonic components from an output of the inverter or attenuating the specific harmonic components to a predetermined level or lower; and
   a voltage controller that controls an output voltage of the inverter to be an intended output voltage by controlling a DC output voltage of the AC/DC converter.

2. The power converter for an electric locomotive according to claim 1, wherein the voltage controller controls the DC output voltage of the AC/DC converter according to the output voltage of the inverter.

3. The power converter for an electric locomotive according to claim 1, wherein the voltage controller controls the DC output voltage of the AC/DC converter according to an input current of the low-voltage AC power.

4. The power converter for an electric locomotive according to claim 1, further comprising:
   a filter provided at a stage subsequent to the inverter, which inhibits output of a component of the specific harmonic components to the load, the component having a frequency higher than a highest central frequency of a harmonic component of the specific harmonic components.

5. The power converter for an electric locomotive according to claim 4, wherein the filter comprises an LC filter having a reactor and a capacitor.

6. The power converter for an electric locomotive according to claim 1, further comprising:
   a reactor provided at a stage subsequent to the inverter to smoothen the output of the inverter.

7. The power converter for an electric locomotive according to claim 1, wherein the specific harmonic components are third to thirteenth-order harmonic components.

8. The power converter for an electric locomotive according to claim 1, wherein the PWM controller generates and outputs the PWM control signal, the PWM control signal including n pulses in one period of a fundamental wave, for removing harmonic components or attenuating the harmonic components to a predetermined level or lower, the harmonic components corresponding to n central frequencies corresponding to switch firing angles of the pulses, n being a natural number.

9. The power converter for an electric locomotive according to claim 1, wherein:
   the load includes a three-phase AC motor, and
   the specific harmonic components are fifth, seventh, eleventh, and thirteenth harmonic components.

* * * * *